(12) United States Patent
Kassai et al.

(10) Patent No.: US 7,114,743 B2
(45) Date of Patent: Oct. 3, 2006

(54) FOLDABLE BABY CARRIAGE

(75) Inventors: Kenzou Kassai, Osaka (JP); Ichiro Ohnishi, Nara (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 232 days.

(21) Appl. No.: 10/762,199

(22) Filed: Jan. 20, 2004

(65) Prior Publication Data

US 2004/0169352 A1  Sep. 2, 2004

(30) Foreign Application Priority Data

Feb. 4, 2003 (JP) ............................. 2003-026601
Feb. 19, 2003 (JP) ............................. 2003-040624

(51) Int. Cl.
 *B62B 7/08* (2006.01)
(52) U.S. Cl. ..................................... 280/650; 280/647
(58) Field of Classification Search ............... 280/642, 280/647, 649, 650, 47.4; 297/16.2, 30, 42
See application file for complete search history.

(56) References Cited

U.S. PATENT DOCUMENTS

| 3,918,734 | A | * | 11/1975 | Firth et al. .................. 280/650 |
| 3,989,295 | A | | 11/1976 | Sparkes |
| 4,248,443 | A | * | 2/1981 | Ohlson ........................ 280/39 |
| 4,619,542 | A | * | 10/1986 | Kassai .......................... 403/62 |
| 4,779,879 | A | | 10/1988 | Kassai |
| 5,669,623 | A | * | 9/1997 | Onishi ........................ 280/642 |
| 5,676,419 | A | | 10/1997 | Kassai et al. |
| 5,752,738 | A | * | 5/1998 | Onishi et al. ................. 297/61 |
| 5,810,382 | A | * | 9/1998 | Onishi ........................ 280/658 |
| 6,105,997 | A | * | 8/2000 | Watkins ...................... 280/649 |
| 6,375,213 | B1 | * | 4/2002 | Suzuki ........................ 280/649 |
| 6,422,587 | B1 | * | 7/2002 | Yamazaki et al. ........... 280/647 |
| 6,464,242 | B1 | * | 10/2002 | Suzuki ........................ 280/642 |
| 6,561,536 | B1 | * | 5/2003 | Suzuki ........................ 280/642 |
| 6,752,413 | B1 | * | 6/2004 | Yamazaki et al. ........... 280/647 |
| 6,860,504 | B1 | * | 3/2005 | Suga et al. .................. 280/642 |
| 6,863,296 | B1 | * | 3/2005 | Yoshie et al. ............... 280/642 |
| 6,877,762 | B1 | * | 4/2005 | Yamazaki .................... 280/647 |
| 6,893,031 | B1 | * | 5/2005 | Suzuki ...................... 280/47.36 |
| 2003/0057682 | A1 | * | 3/2003 | Yoshie et al. ............... 280/647 |
| 2004/0164523 | A1 | * | 8/2004 | Kassai et al. ................ 280/650 |

FOREIGN PATENT DOCUMENTS

| EP | 0494736 | 1/1992 |
| EP | 0697323 | 2/1996 |
| EP | 0900709 | 3/1999 |
| EP | 0908370 | 4/1999 |
| EP | 1228938 | 8/2002 |
| GB | 2285775 | 7/1995 |
| GB | 2380981 | 4/2003 |
| JP | 08058599 | 3/1996 |
| KR | 1989-04928 | 5/1989 |

* cited by examiner

*Primary Examiner*—Jeff Restifo
(74) *Attorney, Agent, or Firm*—W. F. Fasse; W. G. Fasse

(57) ABSTRACT

The folding baby carriage is foldable so that four wheels approach each other back and forth and from side to side. The baby carriage includes a lower frame structure that is positioned above the four wheels to form a seating surface portion of a seat and that is foldable so as to approach back and forth and from side to side with the four wheels, and an inverted U-shaped member extending to rise upward from both sides of the seating surface portion. The inverted U-shaped member remains on a single plane in both the folded state and the opened state without bending out of this plane, but lower ends of the inverted U-shaped member come closer together in the folded state.

24 Claims, 17 Drawing Sheets

FIG. 2        PRIOR ART

FOLDABLE BABY CARRIAGE

BACKGROUND OF THE INVENTION

1. Field of the Invention

The present invention relates to a folding baby carriage and more particularly, to a folding baby carriage folded so that four wheels may approach each other back and forth and from side to side and more particularly, to a folding baby carriage in which its rigidity is enhanced.

2. Description of the Background Art

FIGS. 1 and 2 show a baby carriage disclosed in Japanese Unexamined Patent Publication No. 8-58599. FIG. 1 shows an opened state of the baby carriage and FIG. 2 shows a folded state of the baby carriage. As can be clear when FIG. 1 is compared with FIG. 2, when the baby carriage 1 is folded, four wheels 4 and 6 approach each other back and forth and from side to side.

The illustrated baby carriage 1 comprises a body 2 mainly constituted by bar-shaped members, and a seat hammock 3 mounted on the body 2 to form a seat. The baby carriage body 2 comprises a pair of front legs 5 having the front wheels 4, a pair of rear legs 7 having the rear wheels 6, a pair of handrail members 8 positioned above both sides of the seating surface, a pair of inverting members 9 turnably mounted on rear legs 7, and a push bar 10 having an inverted U-shaped configuration, connected to rear end portions of the pair of handrail members 8 and extending upward.

The push bar 10 has a pair of side vertical bars 11 linearly extending in the vertical direction so as to be parallel to each other, and an upper portion connecting member 12 connecting upper ends of the pair of side vertical bars 11. The upper portion connecting member 12 has a pair of rotating members 12a provided so as to receive the side vertical bars 11 and rotate around the side vertical bars 11, and a center member 12b connecting the pair of rotating members 12a. The rotating member 12a and the center member 12b are connected so as to be allowed to be bent as shown in FIG. 2.

A lower frame structure positioned above the four wheels 4 and 6 and forming a seating surface portion of a seat is folded so that the four wheels 4 and 6 may approach each other back and forth and from side to side. The inverted U-shaped push bar 10 extending to rise upward from both sides of the seating surface portion is bent forward by protruding the center member 12b forward to reduce the dimension in the width direction, in the folded state shown in FIG. 2.

According to the baby carriage disclosed in Japanese Unexamined Patent Publication No. 8-58599, since it is folded while a dimension in the width direction is reduced, the push bar 10 is constituted so as to be allowed to be bent forward. More specifically, each rotating member 12a of the upper portion connecting member 12 is allowed to be rotated around each side vertical bar 11, and the edge of each rotating member 12a is connected to the center member 12b so as to be allowed to be bent.

As described above, when the push bar 10 is constituted by the plural members and those members are connected at joint portions so as to be allowed to be bent, the baby carriage can be folded while its dimension in the width direction is reduced. However, because of the joint portion connecting the adjacent members so as to be allowed to be bent, even in the opened state of the baby carriage, the joint portion of the inverted U-shaped push bar 10 becomes wiggly or flexible. Because the joint portion becomes wiggly or flexible, the push bar 10 is easily twisted or distorted. Since the twist or distortion beginning at the push bar 10 is transmitted to the lower frame structure, the rigidity of the whole baby carriage in the opened state is lowered.

SUMMARY OF THE INVENTION

It is an object of the present invention to provide a folding baby carriage in which rigidity of the baby carriage in an opened state is highly maintained and the baby carriage is folded so as to approach back and forth and from side to side.

It is another object of the present invention to enhance rigidity of a commonly used baby carriage in an opened state.

A folding baby carriage according to the present invention is folded so that four wheels may approach each other back and forth and from side to side and comprises a lower frame structure positioned over the four wheels to form a seating surface portion of a seat, and an inverted U-shaped member extending to rise upward from both sides of the seating surface portion. The lower frame structure is folded so as to approach back and forth and from side to side with the four wheels. In the meantime, the inverted U-shaped member remains on a single plane in both opened state and folded state without actually being bent out of this plane.

According to the present invention, since the inverted U-shaped member is constituted so as not to be actually bent in both opened and folded states, the rigidity of the inverted U-shaped member is enhanced and accordingly, the rigidity of the whole of the baby carriage can be enhanced.

Normally, when the rigidity of the baby carriage body is to be enhanced, a bar-shaped member constituting the body is thickened or a reinforcement member is mounted. That is, in general, a weight of the baby carriage is increased in compensation for enhancement of the rigidity.

In the meantime, according to the present invention, since the joint portion provided for allowing the inverted U-shaped member to be bent is not necessary, the structure of the inverted U-shaped member itself can be reduced in weight and simplified so that the whole weight of the baby carriage can be reduced. In other words, according to the present invention, contrary to the common knowledge in the prior art, the structure can be simplified and reduced in weight while the rigidity is increased.

According to one embodiment, the inverted U-shaped member comprises a first and second members connected in a state in which a three-dimensional movement is restricted. When the three-dimensional movement is restricted, since a part between the first and second members is prevented from being bent, high rigidity can be maintained. As a concrete example, the first member has a peripheral wall receiving an edge of the second member and restricting back-and-forth and up-and-down movements. In addition, for example, the first and second members are connected by a pin extending in the back-and-forth direction.

The inverted U-shaped member may be integrally constituted by a plurality of members or may be constituted by one member. In any case, the inverted U-shaped member preferably comprises a part of a pair of side vertical bars and a part of an upper end lateral bar connecting upper ends of the part of the pair of side vertical bars. The upper end lateral bar part keeps a linear configuration in both opened and folded states. The part of the pair of side vertical bars includes upper ends whose distance is not changed in both opened and folded states, and lower ends whose distance is reduced in accordance with transition from the opened state to the folded state.

According to one embodiment, in the opened state, the part of the pair of side vertical bars includes lower regions extending parallel to each other from the lower ends to a predetermined height and upper regions whose distance is reduced toward the upper side. In this case, a height of the lower regions of the part of the pair of side vertical bars is preferably almost the same as a height of a shoulder of a child seated in a seat. Thus, a large seat space can be provided for the child.

Furthermore, a length of the part of the upper end lateral bar connecting the upper ends of the part of the pair of side vertical bars is preferably almost the same as a length between outer sides of the right and left wheels in the folded state. Thus, the dimension in the folded state of the baby carriage can be reduced.

The inverted U-shaped member may be constituted by three members. More specifically, the inverted U-shaped member includes a pair of side vertical bars and a middle bar connecting the pair of side vertical bars. The middle bar and each side vertical bar are connected in a state in which a three-dimensional movement is restricted. Thus, high rigidity can be maintained.

In the opened state, the pair of side vertical bars preferably includes lower regions extending parallel to each other from the lower ends to a predetermined height, upper regions whose distance is reduced toward the upper side, and horizontal regions extending inward from the upper ends of the upper regions in the width direction. The middle bar connects the inner ends of the pair of horizontal regions.

According to one embodiment, the inverted U-shaped member is a push bar for moving the baby carriage. Each side vertical bar includes a cover member covering a bar portion extending from the horizontal region to the upper region, for example. The cover member has a projection protruding outward, for example. In this case, a distance between the pair of projections positioned at right and left sides may be almost the same as a length between the outer sides of the right and left wheels in the folded state. Since the cover member is provided, an appropriate thickness is provided so that the baby carriage can be easily moved. In addition, even when the distance between the upper regions of the pair of side vertical bars is reduced, since the pair of projections exist, the person who moves the baby carriage can extend the positions for both hands up to the pair of projections so that the moving operation becomes easy.

The lower frame structure has a connection structure which allows inclination of each part of the side vertical bar of the inverted U-shaped member in accordance with the transition from the opened state to the folded state.

According to one embodiment, the lower frame structure comprises a pair of handrail members positioned above both sides of the seating surface, and a connection axis turnably connecting a rear end of the handrail member and the part of the side vertical bar of the inverted U-shaped part. A wall surface of the handrail member opposed to the side vertical bar part through the connection axis includes an abutting wall surface passing the connection axis and abutting on the side vertical bar part, and separated wall surfaces positioned above and below the abutting wall surface and forming a clearance with the side vertical bar part.

More preferably, the lower frame structure comprises a rear leg having a rear wheel, an inverting member turnably connected to the rear leg through a connection pin, provided along the rear leg above the connection pin in an opened state, and provided along the rear leg below the connection pin in a folded state, and a connection axis turnably connecting an edge of the inverting member and the part of the side vertical bar of the inverted U-shaped part. A wall surface of the inverting member opposed to the side vertical bar part through the connection axis includes an abutting wall surface passing the connection axis and abutting on the side vertical bar part, and separated wall surfaces positioned above and below the abutting wall surface and forming a clearance with the side vertical bar part.

In order to prevent the rear portion of the seating surface from being dented, the lower frame structure preferably comprises a pair of seating surface supporting side bars extending back and forth along both sides of the seating surface in order to support the seating surface from beneath. Each seating surface supporting side bar integrally has an inward extending portion extending toward the inside so as to support the seating surface from beneath.

Since the rigid inward extending portion stably supports the seating surface from beneath, the seating surface is not dented so that the seated posture of the child can be appropriately maintained. Especially, in view of prevention of being dented at the rear portion of the seating surface, the inward extending portion preferably extends from a rear part of the seating surface supporting side bar to the inside.

Preferably, each seating surface supporting side bar integrally has the inward extending portion. The seating surface supporting side bar may be constituted by a member different from that of the inward extending portion. In this case also, when both are integrally constituted, its rigidity is increased. As a result, the seating surface can be stably supported.

According to one embodiment, the inward extending portion is formed by bending a rear end part of the seating surface supporting side bar to the inside in the shape of horseshoe. According to the seating surface supporting side bar having such configuration, the seating surface can be stably supported with a very simple structure.

As one example of a concrete embodiment, the baby carriage comprises a rear leg having a rear wheel, an inverting member turnably connected to the rear leg through a connection pin, provided along the rear leg above the connection pin in an opened state, and provided along the rear leg below the connection pin in a folded state, and a connection member turnably connected to the inverting member. Preferably, the seating surface supporting side bar and the connection member are fixed, and a portion extending backward of the seating surface supporting side bar beyond the connection member has been bent in the shape of horseshoe.

Preferably, a distance between the pair of inward extending portions positioned at right and left sides of the baby carriage in the opened state has a dimension corresponding to a distance in which the pair of seating surface supporting side bars approach each other in accordance with a folding operation. Such dimensional relation does not hinder the folding operation.

According to one embodiment, the baby carriage comprises a plate-shaped seating surface core forming the seating surface. Preferably, the seating surface core is connected to the pair of seating surface supporting side bars. According to such constitution, since the position of the seating surface core can be fixed and stably supported by the inward extending portion from beneath, the position of the seating surface can be surely stabilized. In this case, the seating surface core is preferably connected to the inward extending portion of the pair of seating surface supporting side bars.

In the above case, the seating surface core and the pair of seating surface supporting side bars are connected through a belt, for example. In addition, the baby carriage preferably comprises a bending link member connecting front portions of the pair of seating surface supporting side bars. The bending link member has a center link bar and a pair of side link bars provided so as to be allowed to be bent. The seating surface core is preferably connected to the center link bar.

A folding baby carriage according to another aspect of the present invention comprises a lower frame structure positioned over four wheels to form a seating surface portion of a seat and the lower frame structure is folded. This folding baby carriage includes a baby carriage which is folded without being reduced in dimension in the width direction, for example. As one example, the folding baby carriage is folded so that four wheels approach each other back and forth only.

The folding baby carriage according to this aspect comprises a push bar for moving the baby carriage and an inverted U-shaped member extending to rise upward from both sides of said seating surface portion and remaining on the same plane in both opened and folded states without actually being bent out of this plane, separately from said push bar. Since such an inverted U-shaped member is provided, the rigidity of the baby carriage in the opened state is enhanced.

In a baby carriage which can be changed between a state pushed from behind and a state pushed face-to-face by the push bar, when the above inverted U-shaped member is provided, the rigidity of a seat structure of the baby carriage in the state pushed face-to-face can be preferably maintained, especially.

The lower frame structure includes a pair of handrail members positioned above both sides of the seating surface and the inverted U-shaped member extends to rise upward from a rear end of the pair of handrail members, for example. The inverted U-shaped member is used as a frame for supporting a backrest portion of the seat, for example. Alternatively, the inverted U-shaped member is used as a part of a roof for shade.

DESCRIPTION OF THE PREFERRED EMBODIMENTS

Figure 1:
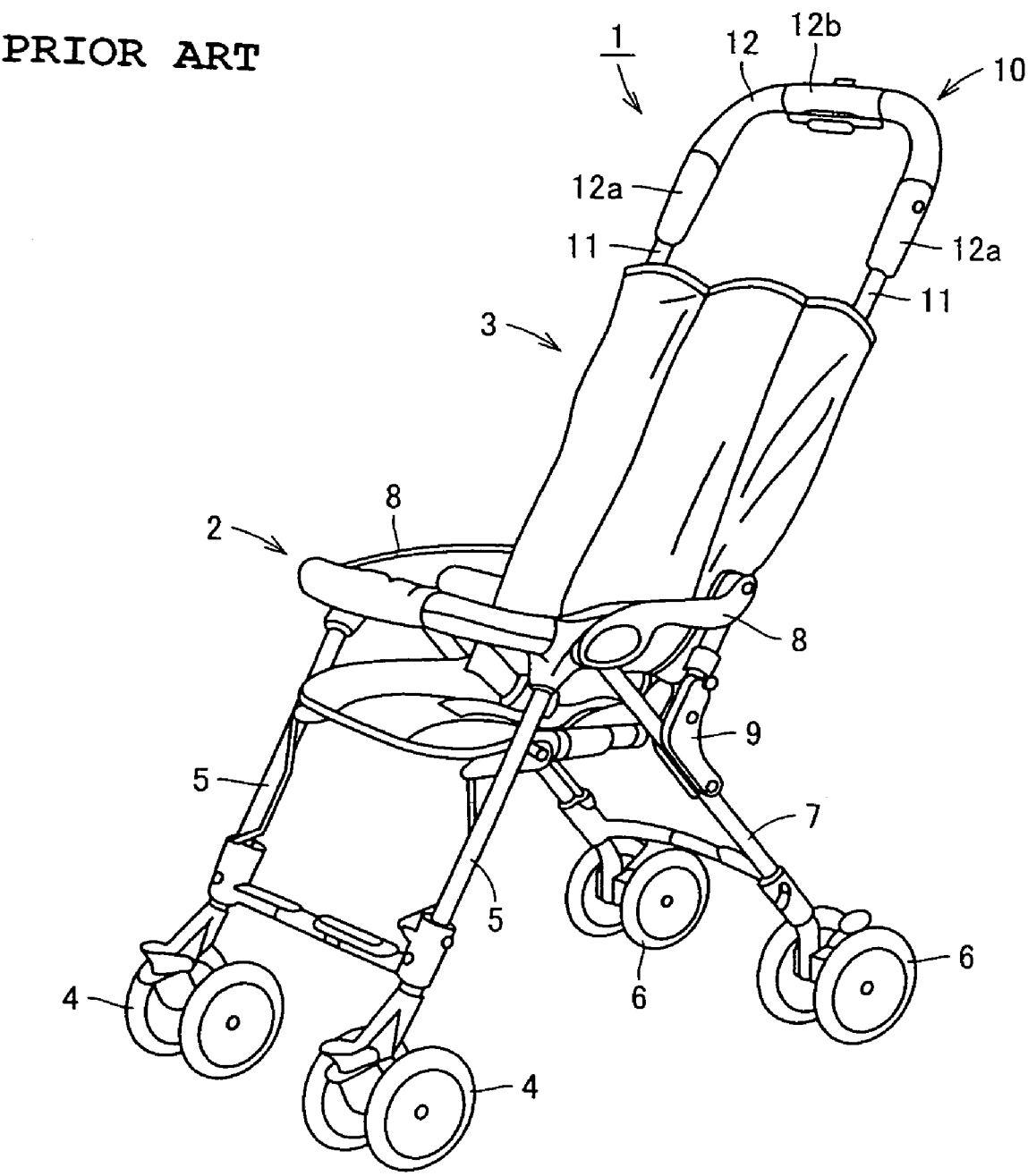
FIG. 1 is a perspective view showing a baby carriage disclosed in Japanese Unexamined Patent Publication No. 8-58599.
Figure 2:
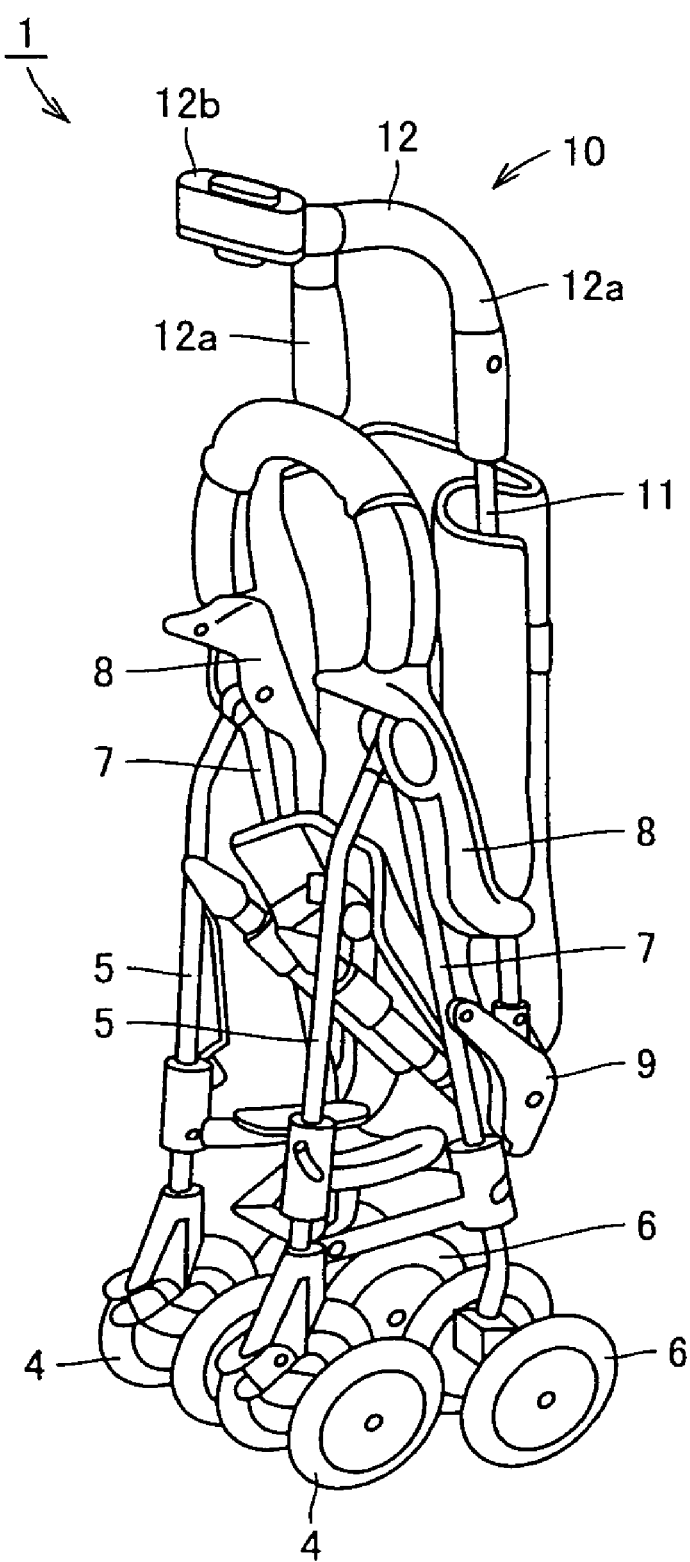
FIG. 2 is a perspective view showing a folded state of the baby carriage shown in FIG. 1.
Figure 3:
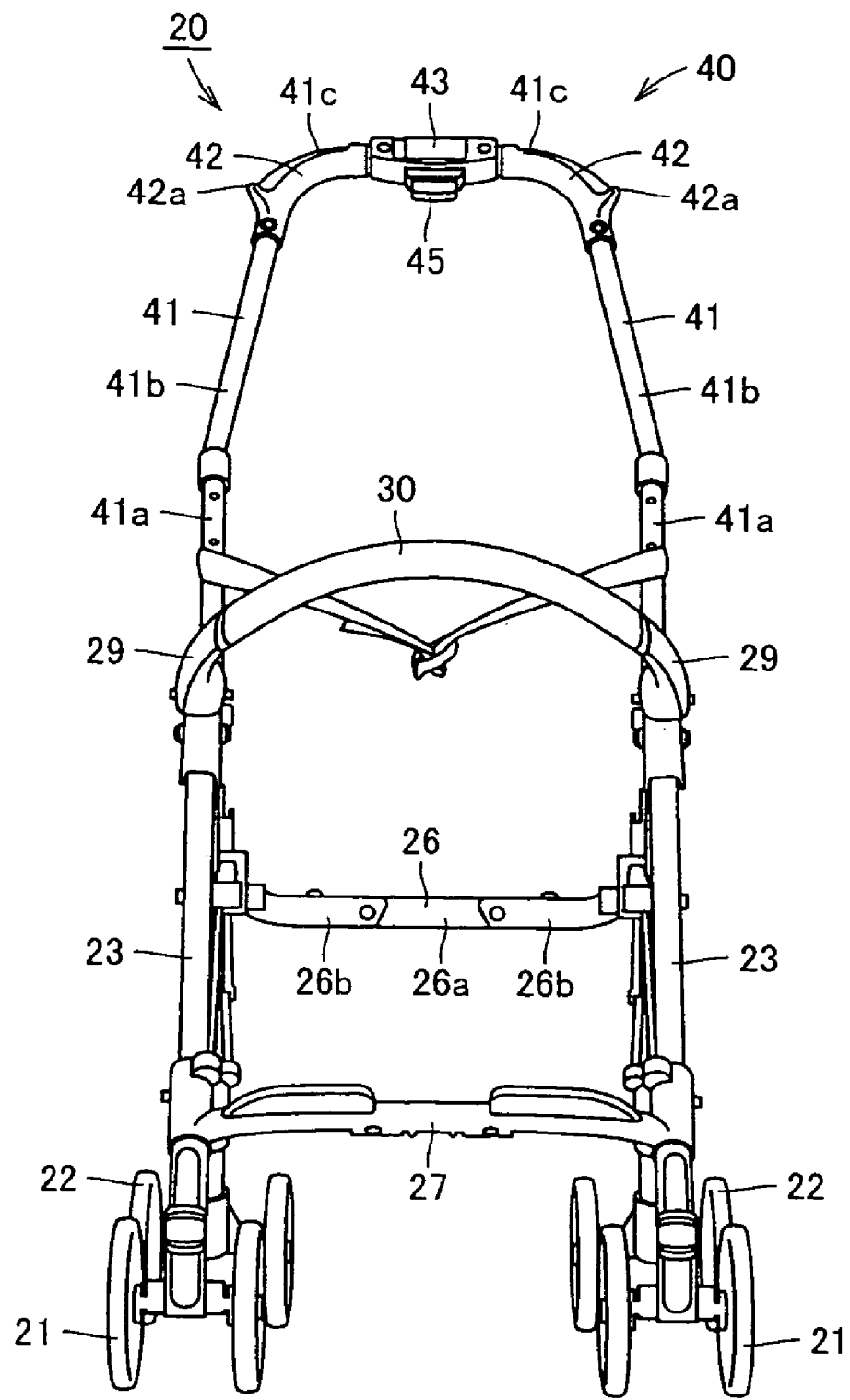
FIG. 3 is a front view showing a baby carriage according to one embodiment of the present invention.
Figure 4:
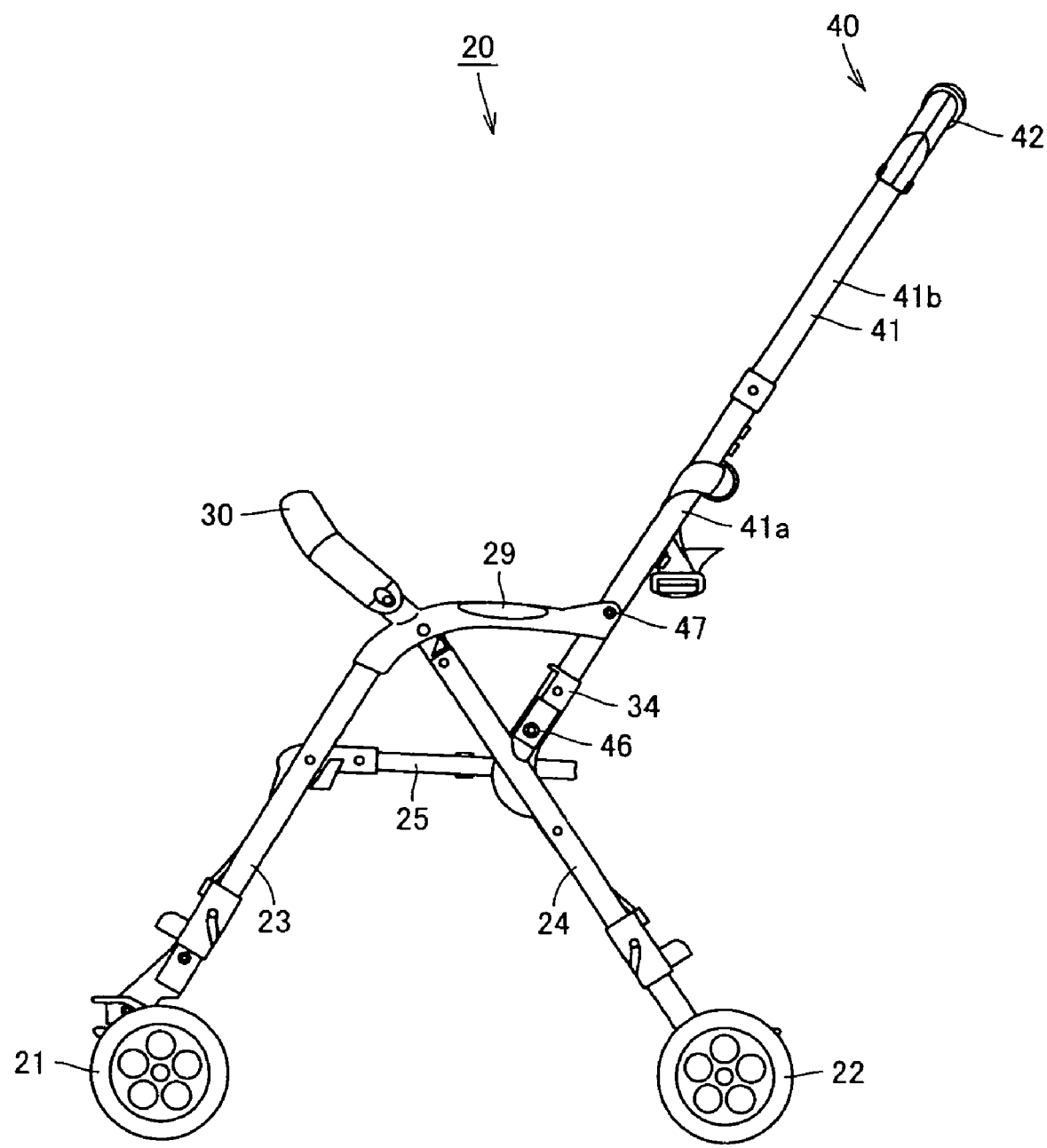
FIG. 4 is a side view showing the baby carriage shown in FIG. 3.
Figure 5:
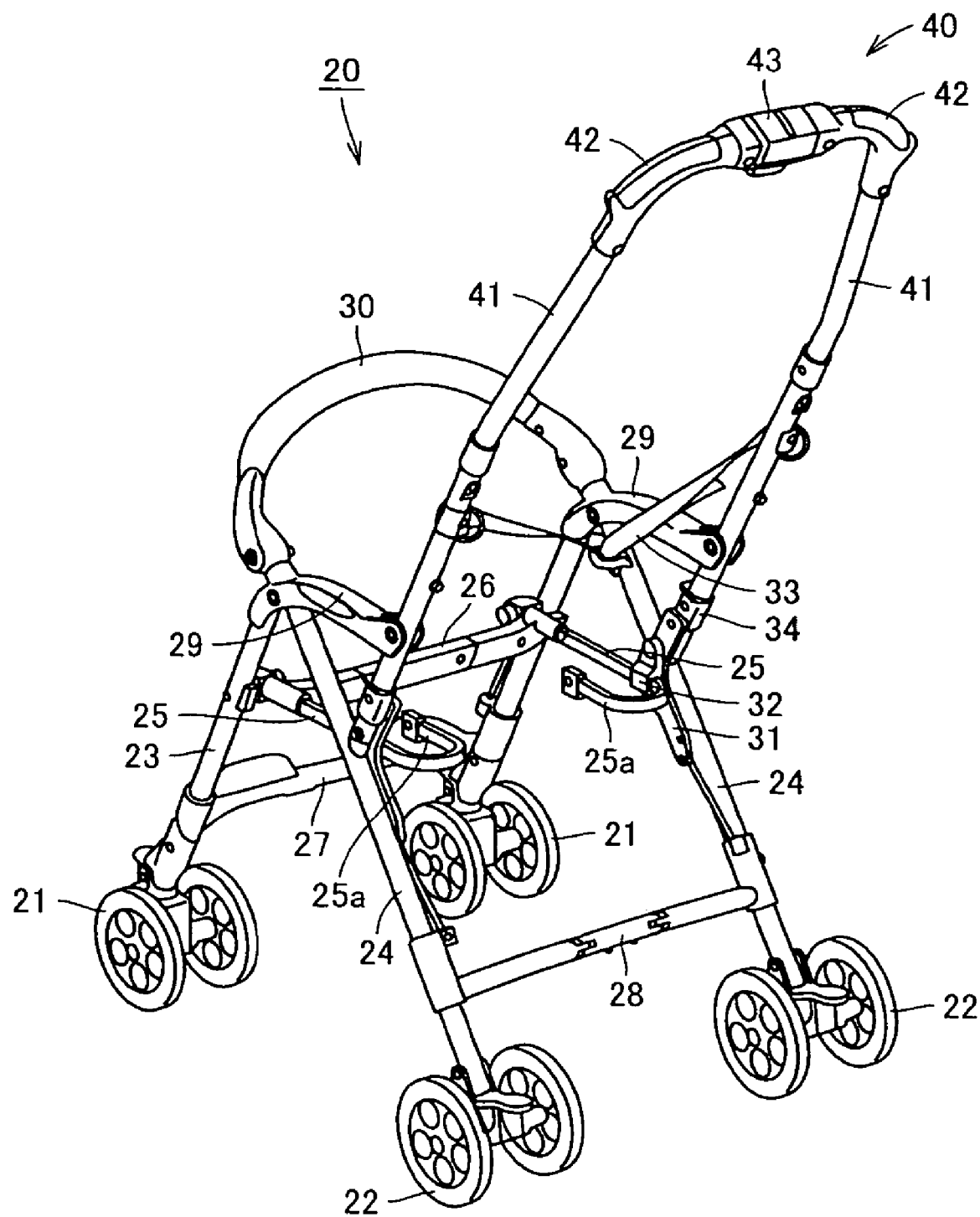
FIG. 5 is a perspective view showing the baby carriage shown in FIG. 3.
Figure 6:
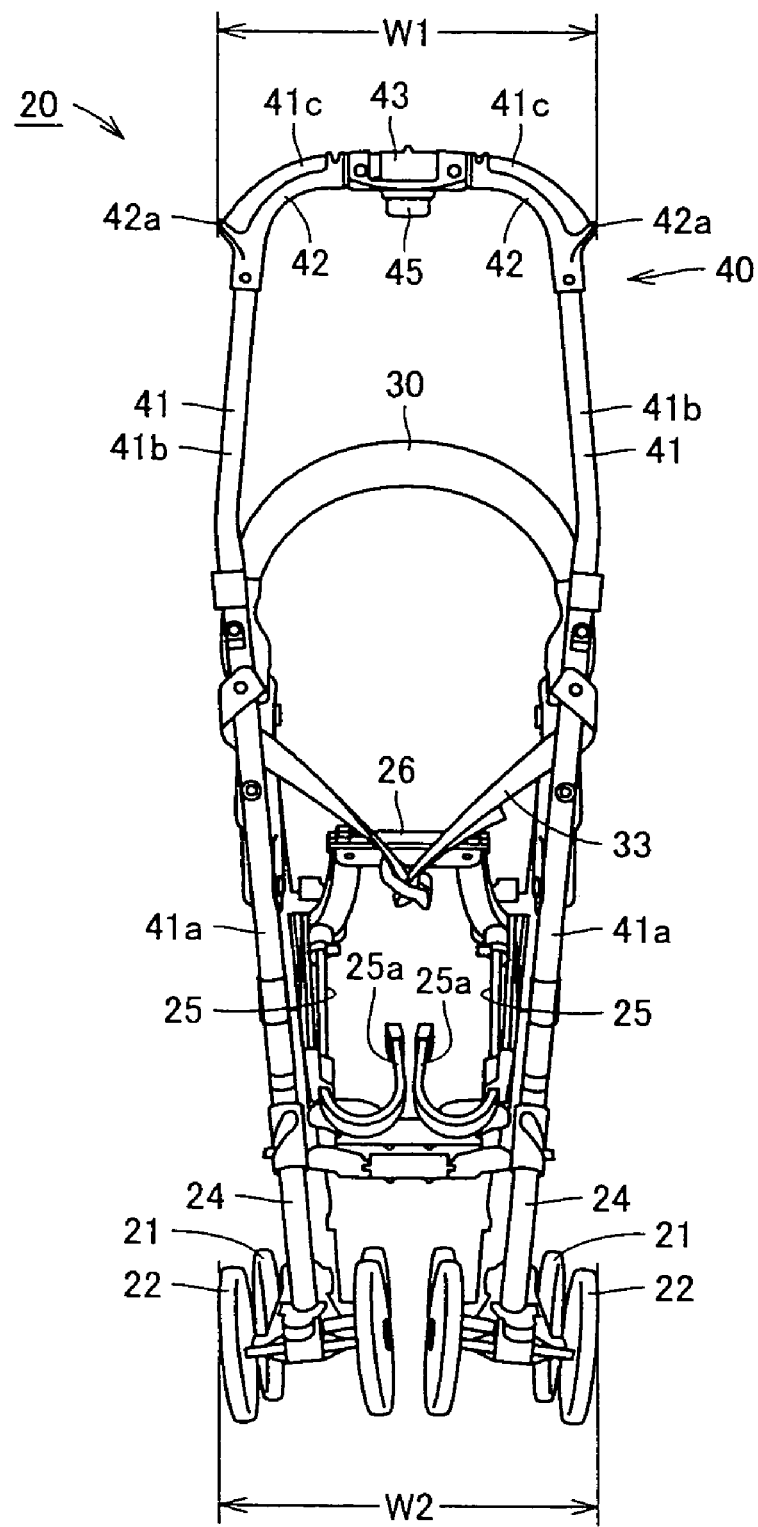
FIG. 6 is a back view showing a folded state of the baby carriage shown in FIG. 3.

One embodiment of the present invention is described with reference to the drawings hereinafter. FIG. 3 is a front view showing a baby carriage 20, FIG. 4 is a side view thereof, FIG. 5 is a perspective view thereof and FIG. 6 is a back view showing a folded state thereof.

The illustrated baby carriage 20 is folded so that four wheels 21 and 22 approach each other back and forth and from side to side. As a basic frame structure, the baby carriage 20 comprises a pair of front legs 23 having front wheels 21, a pair of rear legs 24 having rear wheels 22, a pair of seating surface supporting side bars 25 extending back and forth along both sides of a seating surface in order to support the seating surface from beneath, a pair of handrail members 29 positioned above both sides of the seating surface, an inverted U-shaped push bar 40 extending to rise upward from both sides of the seating surface portion, a connection member 27 connecting the pair of front legs 23, a connection member 28 connecting the pair of rear legs 24, a front guard member 30 extending across the pair of handrail members, and a bending link member 26 connecting front ends of the pair of seating surface supporting side bars 25.

In order to implement a folding movement of the baby carriage 20, an upper end of the front leg 23 and an upper end of the rear leg 24 are turnably connected to the handrail member 29, respectively. When the baby carriage 20 is folded, the front and rear wheels 21 and 22 approach each other.

Figure 12:
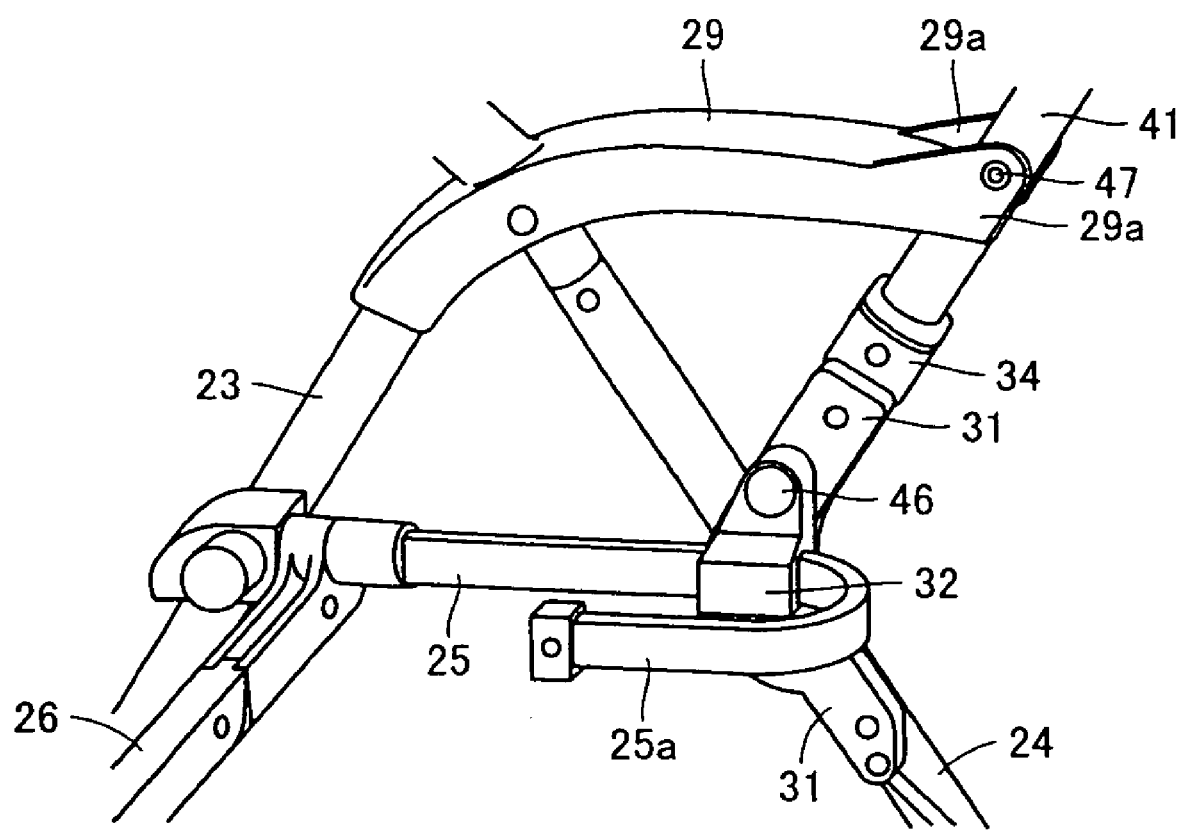
FIG. 12 is a perspective view showing a connection portion between a side vertical bar, a rear leg and a seating surface supporting side bar.
Figure 13:
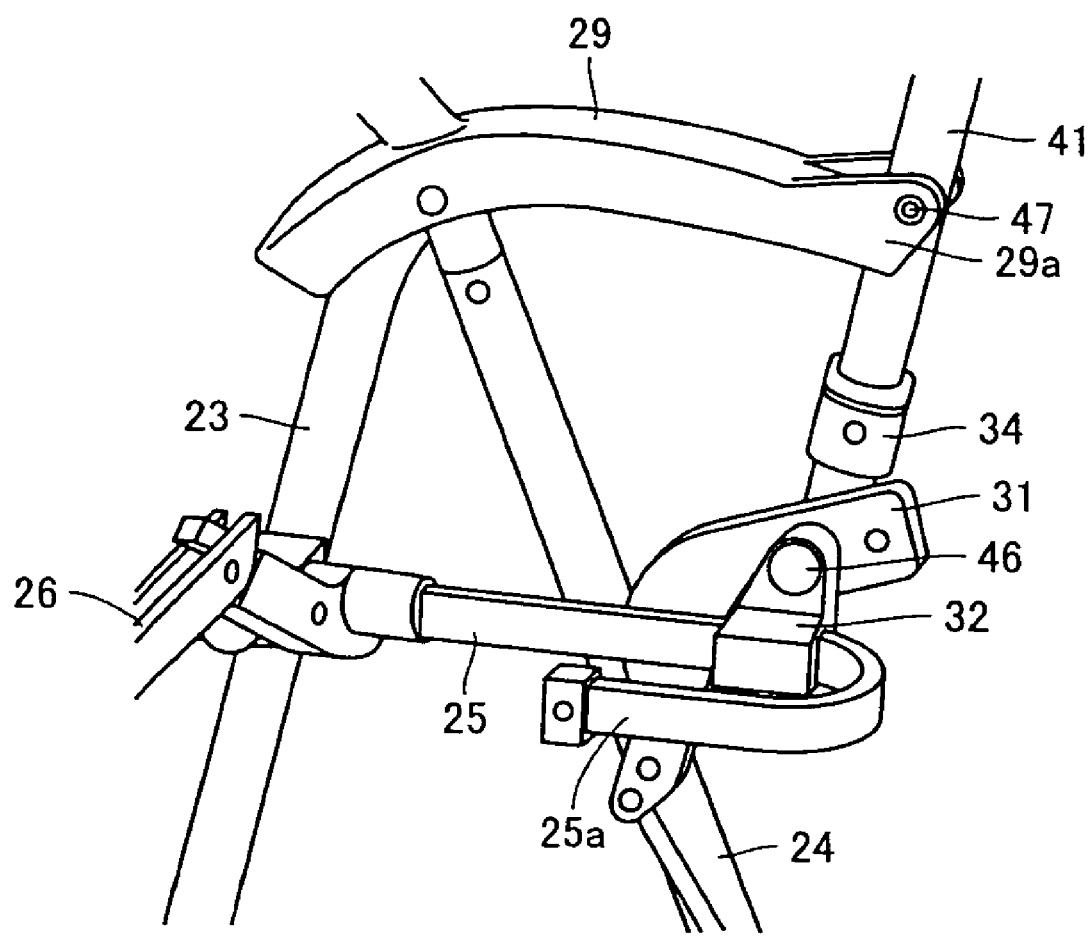
FIG. 13 is a view showing a state of the connection portion shown in FIG. 12 on the way to a folding operation.
Figure 14:
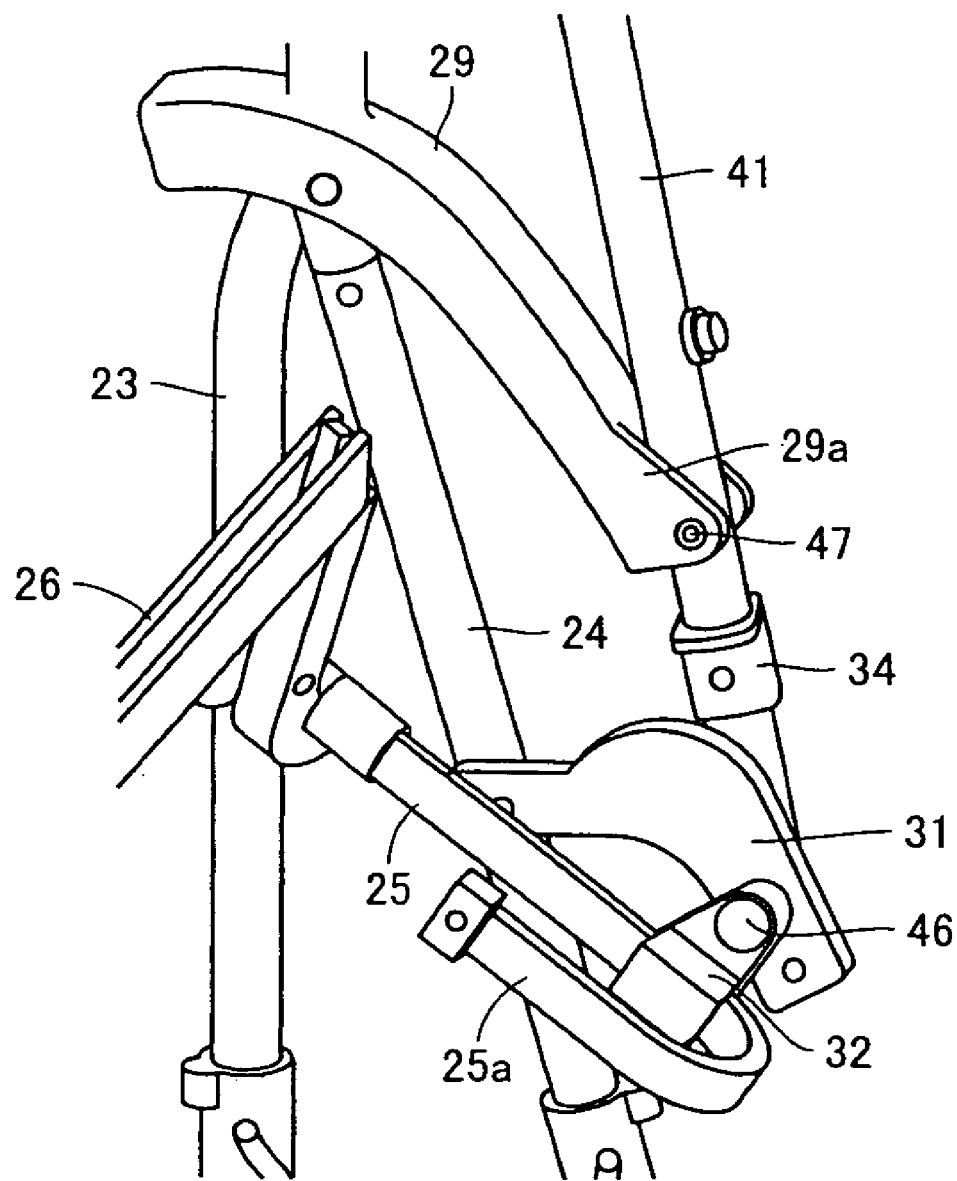
FIG. 14 is a view showing a folded state of the connection portion shown in FIG. 12.

The front end portion of the seating surface supporting side bar 25 is turnably connected to the front leg 23 and a rear end portion thereof is turnably connected to an inverting member 31 through a connection member 32 and a connection axis 46 (FIGS. 12 through 14).

The inverted U-shaped push bar 40 comprises a pair of side vertical bars 41 extending to rise upward from both sides of the seating surface portion and a middle bar 43 connecting the pair of side vertical bars 41. A rear end portion of the handrail member 29 is turnably connected to the side vertical bar 41 through a connection axis 47. Although a description is made in detail later, a lower end of the side vertical bar 41 is turnably connected to the inverting member 31 through the connection axis 46. As shown in FIG. 5, a back surface belt 33 connects the pair of side vertical bars 41 so as to support a backrest portion of a seat hammock (not shown) from behind.

The bending link member 26 connecting the pair of seating surface supporting side bars 25 is provided so as to be allowed to be bent upwardly so that the right and left wheels may approach each other to reduce a dimension in the width direction at the time of a folding operation. More specifically, as shown in FIG. 3, the bending link member 26 has a center link bar 26*a* and a pair of side link bars 26*b* which are connected so as to be allowed to be bent, and an outer end of each side link bar 26*b* can be turned around the seating surface supporting side bar 25.

Like the bending link member 26, the connection member 28 connecting the pair of rear legs 24 and the connection member 27 connecting the pair of front legs 23 are provided so as to be allowed to be bent. The front guard member 30 connecting the pair of handrail members 29 is formed of a flexible material so that the right and left ends thereof can approach each other in accordance with the folding operation.

Referring to FIGS. 12 through 14, a description is made of a connection structure between the side vertical bar 41 of the push bar 40, the rear leg 24 and the seating surface supporting side bar 25. Besides, a description is made of a configuration of the seating surface supporting side bar 25. FIG. 12 shows an opened state of the baby carriage, FIG. 13 shows a state on the way to the folding operation and FIG. 14 shows a folded state thereof.

The connection member 32 is fixed to the rear end of the seating surface supporting side bar 25. As can be clear from FIG. 12, the seating surface supporting side bar 25 integrally has an inward extending portion 25*a* which extends inward, at a rear part thereof. More specifically, the portion extending backward beyond the connection member 32 has been bent in a horseshoe shape to form the inward extending portion 25*a*. The inward extending portion 25*a* supports the seating surface from beneath. Since the rear portion of the seating surface is stably supported by the rigid inward extending portion 25*a* of the seating surface supporting side bar 25, there is no dented portion at the rear portion of the seating surface so that a posture of a child seated in the seat of the baby carriage can be appropriately maintained. The inward extending portions 25*a* of the pair of seating surface supporting side bars approach each other in accordance with the folding operation of the baby carriage. It is necessary to appropriately select a distance between the right and left inward extending portions 25*a* so as not to hinder the folding operation and to reduce the dimension in the width direction in the folded state as much as possible. More specifically, as shown in FIG. 6, a dimensional relation is preferably such that the right and left inward extending portions 25*a* are in very close contact with each other in the folded state of the baby carriage.

The inverting member 31 is turnably mounted on each rear leg 24 through a connection pin. In the opened state of the baby carriage shown in FIG. 12, the inverting member 31 is positioned above the connection pin along the rear leg 24 and in the folded state of the baby carriage shown in FIG. 14, the inverting member 31 is positioned below the connection pin along the rear leg 24.

The lower end of the side vertical bar 41 of the push bar 40 is turnably connected to an edge portion of the inverting member 31 through the connection axis 46. As can be clear when FIGS. 12 through 14 are compared, the connection axis 46 turnably connects the rear end of the seating surface supporting side bar 25, the edge portion of the inverting member 31 and the lower end of the side vertical bar 41.

A slide member 34 which can be slid in the vertical direction is provided at the lower end portion of the side vertical bar 41 of the push bar 40. The slide member 34 is connected to an operation button 45 (see FIG. 3) provided in the middle bar 43 of the push bar 40 through a wire passing through the push bar 40 so as to be operated by the operation button 45. When the operation button is operated, the slide member 34 can be moved upward. In addition, the slide member 34 is always forced downward by a spring although it is not shown.

In the opened state of the baby carriage shown in FIG. 12, the slide member 34 engages with the inverting member 31 to inhibit the movement of the inverting member 31. When the baby carriage is folded, the operation button 45 is operated to move the slide member 34 upward and the engagement between the slide member 34 and the inverting member 31 is released.

Then, referring to FIGS. 7 through 11, a structure of the inverted U-shaped push bar 40 is described. As shown in the drawings, in the opened state of the baby carriage, the pair of side vertical bars 41 comprises lower regions 41*a* extending parallel to each other from lower ends thereof up to a predetermined height, upper regions 41*b* whose distance is reduced toward the upper side, and horizontal regions 41*c* extending inward from upper ends of the upper regions 41*b* in the width direction. The middle bar 43 connects inner ends of the horizontal regions 41*b* of the pair of side vertical bars 41.

Preferably, a height of the lower region of the side vertical bar 41 is set to be almost the same as a height of a shoulder of a child seated in the seat. Thus, a large seat space can be provided for the child in the seat.

The inverted U-shaped push bar 40 comprising the pair of side vertical bars 41 and the middle bar 43 is not actually substantially bent and keeps substantially the same configuration lying on the same plane in both opened and folded states of the baby carriage with the lower ends of the lower regions 41*a* of the side vertical bars 41 merely approaching each other in the transition to the folded state as described in detail below. The reason why the distance between the upper regions 41*b* of the pair of side vertical bars 41 becomes smaller toward the upper side is that a folded dimension of the baby carriage is to be reduced. The width dimension formed by the horizontal regions 41*c* of the pair of side vertical bars 41 and the middle bar 43 is hardly changed in both opened and folded states of the baby carriage.

Figure 7:
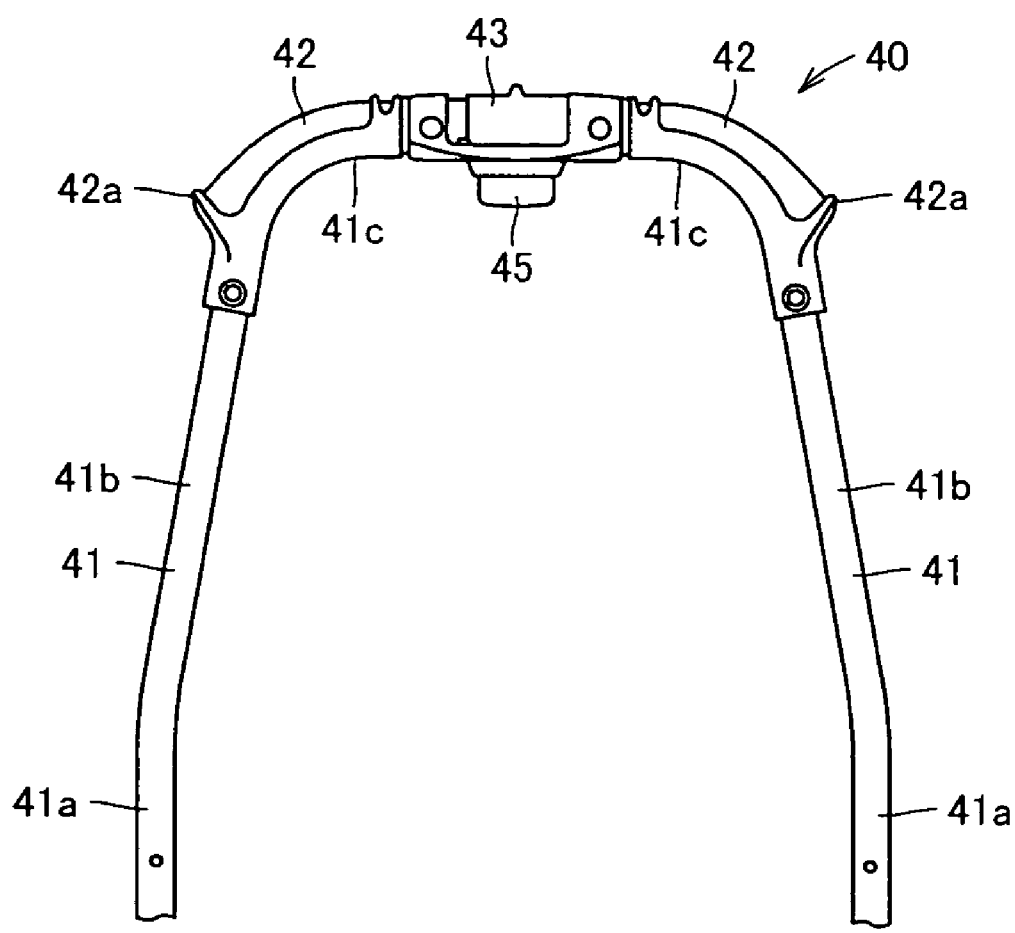
FIG. 7 is a front view showing a push bar 40.

According to the illustrated embodiment, each side vertical bar 41 of the push bar 40 has a cover member 42 extending from the horizontal region 41*c* to the upper portion of the upper region 41*b* to cover the bar. Because of the cover member 42, a thickness of the bar gripped by a person moving the baby carriage can be appropriately provided. In addition, as shown in FIG. 7, the cover members 42 have projections 42*a* protruding outward from both sides. As shown in FIG. 6, it is preferable that a distance W1 between the pair of projections 42*a* is almost the same as a length W2 between outer sides of the right and left wheels 22 in the folded state. The width dimension in the folded state can be small in this dimensional relation. Still further, even when the distance between the upper regions 41*b* of the pair of side vertical bars 41 is reduced, since the pair of projections exist, the person moving the baby carriage can extend positions for both hands up to the pair of projections 42*a* to easily move the baby carriage.

Figure 8:
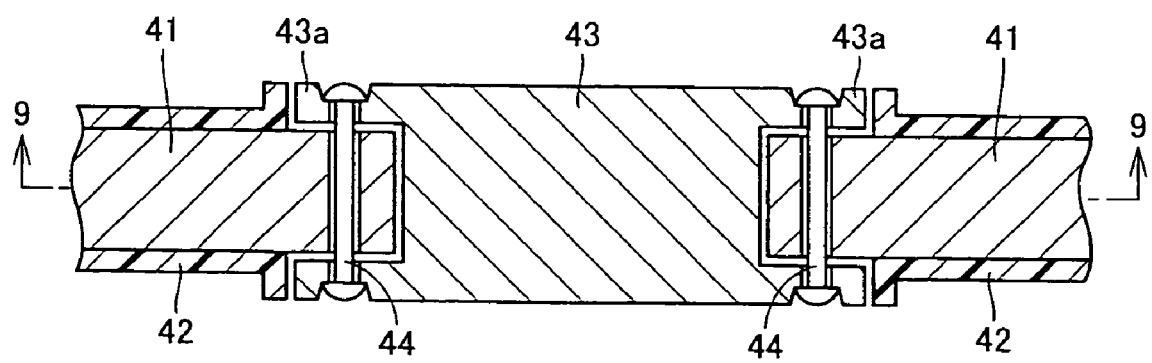
FIG. 8 is a sectional view showing a connection portion between the side vertical bar and the middle bar of the push bar.
Figure 9:
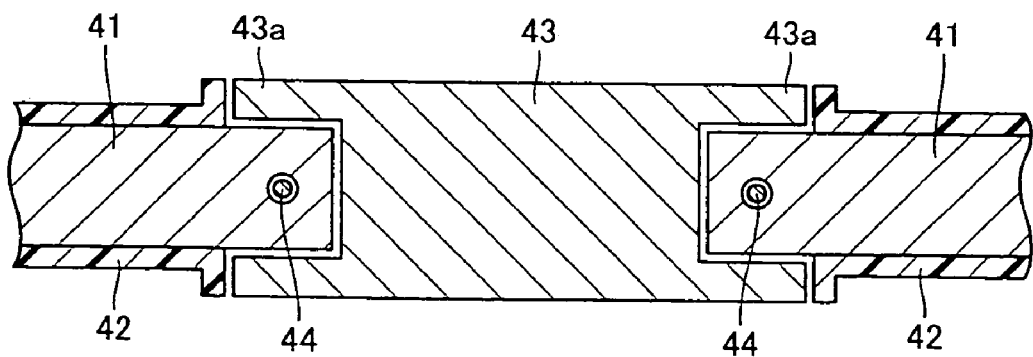
FIG. 9 is a sectional view taken along line 9—9 in FIG. 8.

The middle bar 43 of the push bar 40 and each side vertical bar 41 are connected in a state in which a three-dimensional movement is restricted. Here, the three-dimensional movement means a movement of back and forth, up and down and from side to side. Referring to FIGS. 8 and 9, a concrete example of such connection structure is described. Although the middle bar 43 and each side vertical bar 41 have space inside actually, they are shown as solid for simplicity in FIGS. 8 and 9.

The middle bar 43 has peripheral walls 43a at both ends which receive edges of the side vertical bars 41 to restrict the back-and-forth and up-and-down movements thereof. The peripheral wall 43a of the middle bar 43 is connected to the edge of the side vertical bar 41 by a pin 44 extending back and forth. FIG. 9 is a sectional view taken along line 9—9 in FIG. 8. Since the peripheral wall 43a of the middle bar 43 is positioned around the edge of the side vertical bar 41, the side vertical bar 41 is prevented from being bent in the back-and-forth direction (the axis direction of the pin 44, that is, the vertical direction in FIG. 8) and in the up-and-down direction (in the vertical direction in FIG. 9). In addition, since the pin 44 connects the peripheral wall 43a of the middle bar 43 to the edge of the side vertical bar 41, the movement in the right-and-left direction is restricted.

There is a small clearance between the edge of the side vertical bar 41 and the peripheral wall 43a of the middle bar 43. A dimension of this clearance is selected such that the lower ends of the lower regions 41a of the pair of side vertical bars 41 can approach each other in accordance with the folding operation of the lower frame structure which forms the seating surface portion of the baby carriage while the horizontal regions 41c of the pair of side vertical bars 41 and the middle bar 43 are kept in almost the linear state in the folded state of the baby carriage.

Figure 10:
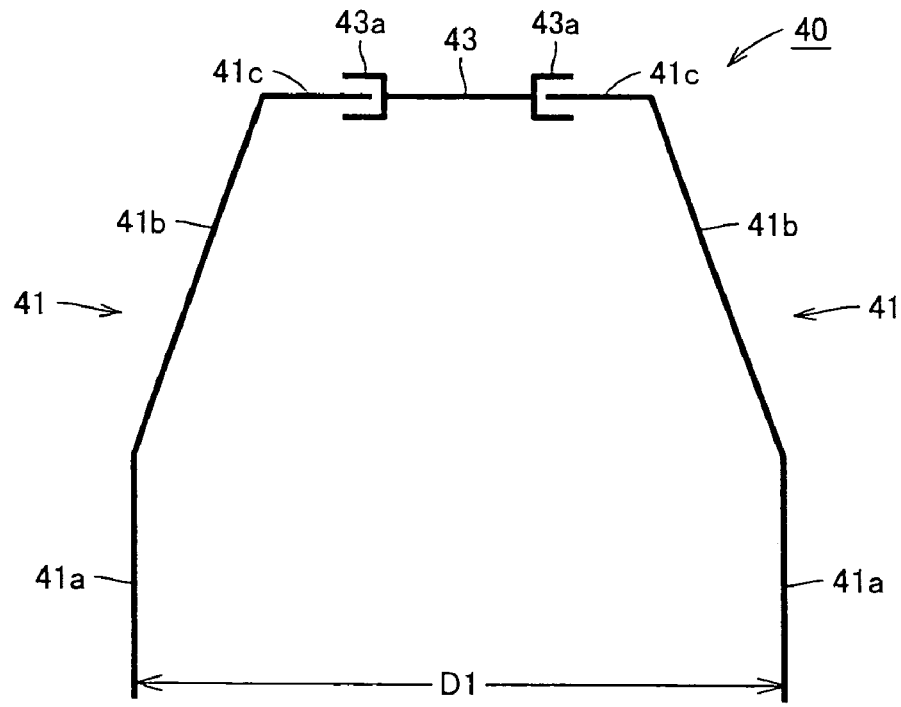
FIG. 10 is a view schematically showing a configuration of the push bar in an opened state of the baby carriage.
Figure 11:
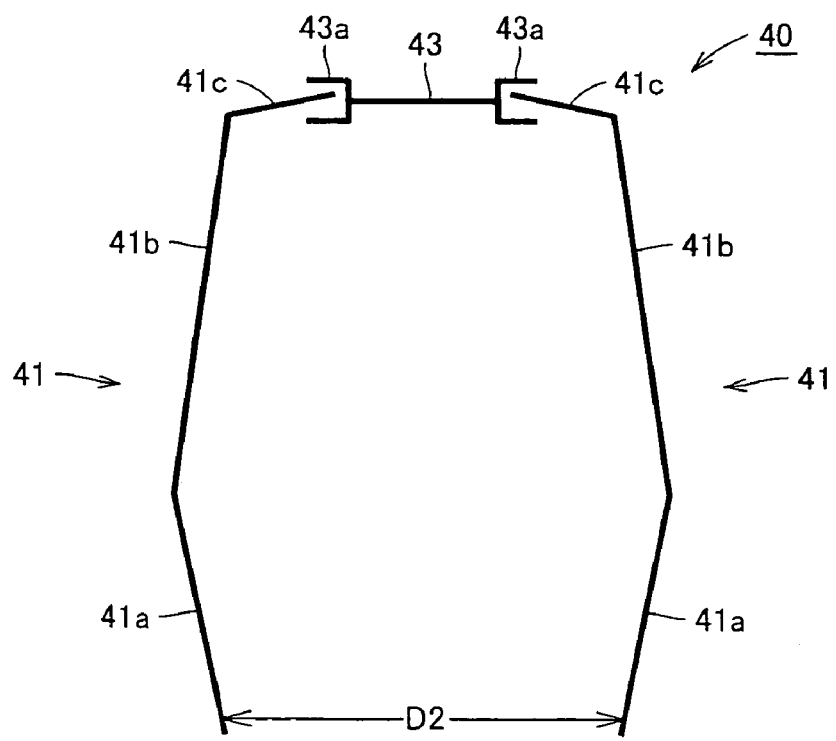
FIG. 11 is a view schematically showing a configuration of the push bar in a folded state of the baby carriage.

FIGS. 10 and 11 schematically show the operation of the push bar 40 with exaggeration. FIG. 10 shows a configuration of the push bar 40 in the opened state of the baby carriage and FIG. 11 shows a configuration of the push bar 40 in the folded state of the baby carriage. The distance between the lower ends of the pair of side vertical bars 41 is reduced from a width dimension D1 in the opened state to a width dimension D2 in the folded state. While the width dimension between the lower ends of the pair of side vertical bars 41 can be reduced, the linear state of the horizontal region 41c of the side vertical bar 41 and the middle bar 43 is hardly changed in both opened and folded states of the baby carriage.

Although the lower frame structure of the baby carriage is folded so that the four wheels 21 and 22 may approach each other back and forth and from side to side, the inverted U-shaped push bar 40 is not substantially bent and keeps almost the same configuration lying in the same plane in both opened and folded states. Therefore, rigidity of the push bar 40 is increased and accordingly, rigidity of the baby carriage in the opened state is increased.

The lower frame structure preferably has a connection structure allowing inclination of the side vertical bar 41 of the push bar 40 in accordance with transition from the opened state to the folded state. This is described hereinafter with reference to FIGS. 15 through 17.

Figure 15:
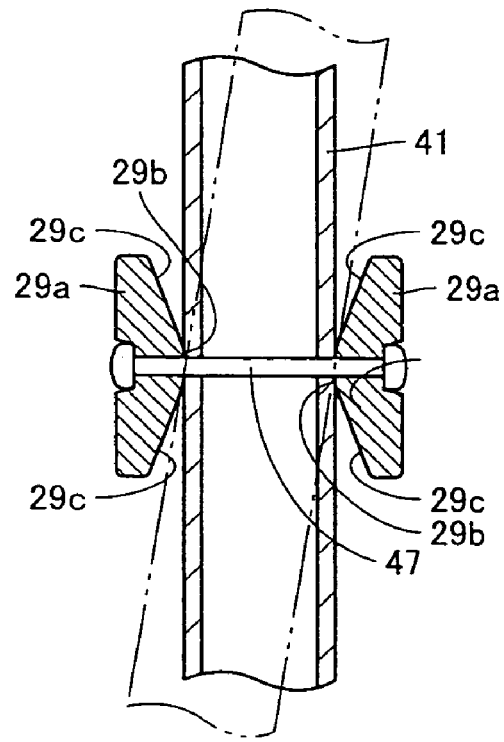
FIG. 15 is a sectional view showing a connection portion between the side vertical bar and a rear end of a handrail member.

FIG. 15 is a sectional view showing a connection portion between the side vertical bar 41 and the handrail member 29. The handrail member 29 has a pair of backward projection walls 29a protruding backward, at its rear ends. The side vertical bar 41 is received in the pair of backward projection walls 29a. As shown in FIG. 15, the backward projection wall 29a of the handrail member 29 has an abutting wall surface 29b which passes the connection axis 47 and abuts on the side vertical bar 41 and separated wall surfaces 29c which are positioned above and below the abutting wall surface and form a clearance with the side vertical bar 41. Since the separated wall surface 29c exists, the side vertical bar 41 can be slightly inclined when the baby carriage is folded as shown by a phantom line in FIG. 15.

Figure 16:
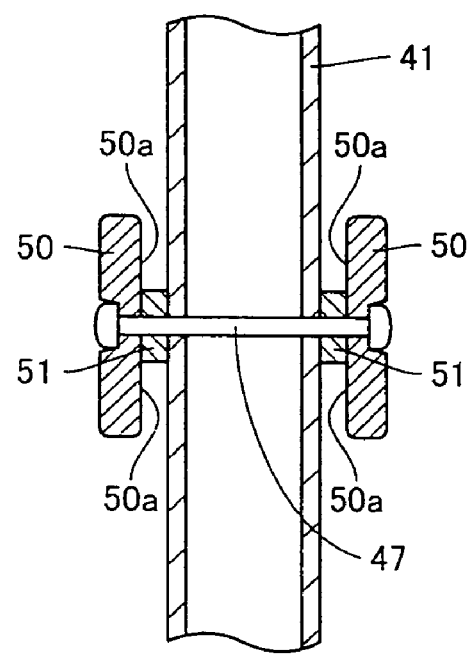
FIG. 16 is a sectional view showing another example of a connection portion between the side vertical bar and a rear end of a handrail member.

FIG. 16 is a variation of the structure shown in FIG. 15. According to a structure shown in FIG. 16, the backward projection wall 50 of the handrail member has a plane-shaped configuration having the same thickness. A spacer 51 is arranged between the backward projection wall 50 and the side vertical bar 41. A separated wall surface 50a is formed at the backward projection wall 50 of the handrail member because of the spacer 51. The spacer 51 forms an abutting wall surface. In such structure also, the side vertical bar 41 is allowed to be inclined.

Figure 17:
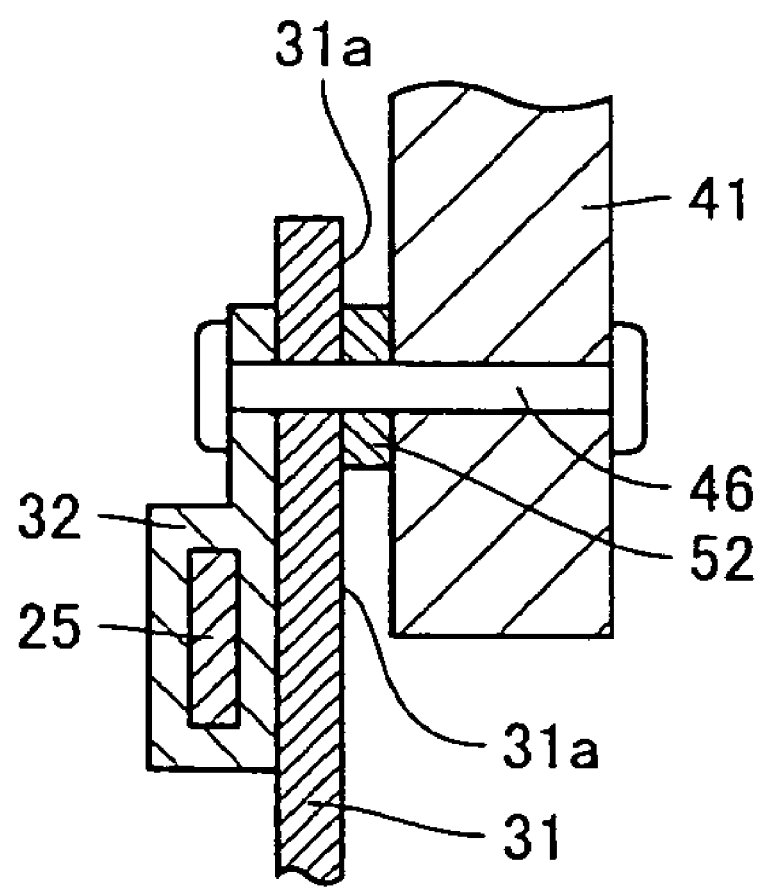
FIG. 17 is a sectional view showing a connection portion between a lower end of the side vertical bar and an inverting member.

FIG. 17 shows a connection portion between the lower end of the side vertical bar 41 and the inverting member 31. As shown in FIG. 17, a spacer 52 is arranged between the side vertical bar 41 and the inverting member 31. The spacer 52 forms an abutting wall surface. A separated wall surface 31a is formed at the inverting member 31 because of the spacer 52. Therefore, the side vertical bar 41 is allowed to be inclined in the folded state of the baby carriage.

Figure 18:
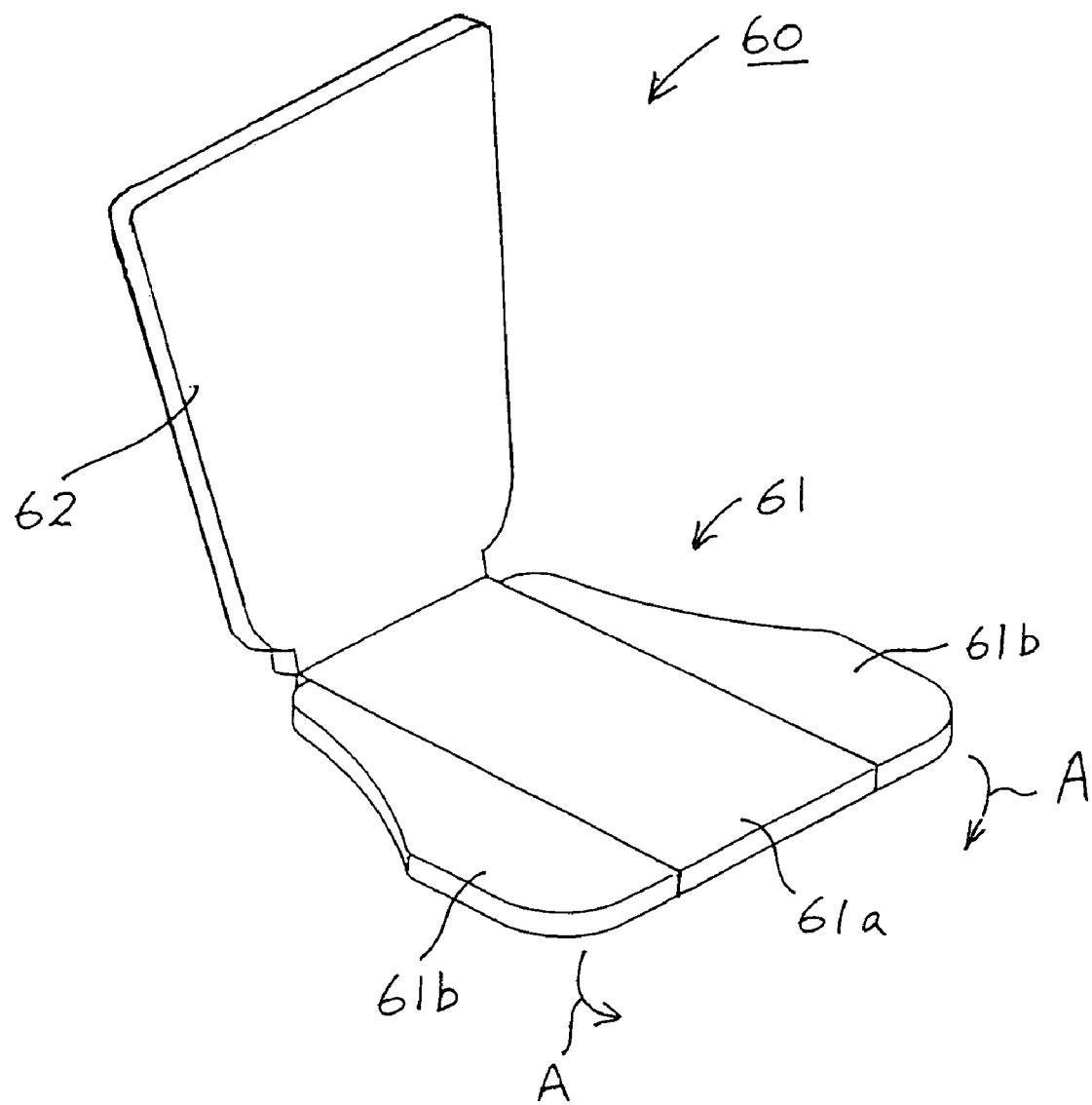
FIG. 18 is a perspective view showing a seating surface core.

The baby carriage preferably has a seat core 60 as shown in FIG. 18. The seat core 60 is mounted on a body of the baby carriage and comprises a seating surface core 61 and a backrest surface core 62 which are connected so as to be allowed to be bent. The seating surface core 61 has a center portion 61a and a pair of side portions 61b which are connected so as to be allowed to be bent, so that the dimension in the width direction can be reduced when the baby carriage is folded. The pair of side portions 61b are turned in the direction shown by an arrow A in the drawing when folded.

Figure 19:
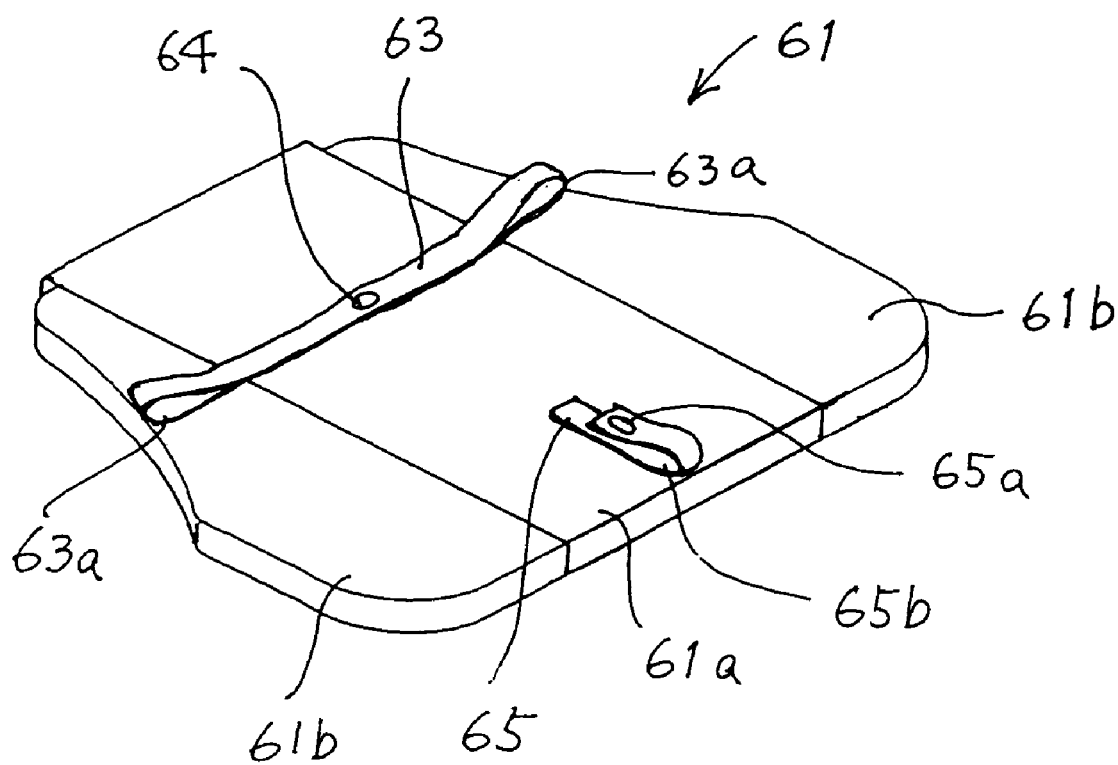
FIG. 19 is a perspective view showing a back surface of the seating surface core.

FIG. 19 shows a back surface of the seating surface core 61. As shown in FIG. 19, a rear belt 63 and a front belt 65 are mounted on the back surface of the seating surface core 61. The rear belt 63 is mounted on the seating surface core 61 through a rivet 64, for example and has loop portions 63a at both sides thereof. The front belt 65 is also mounted on the seating surface core 61 through a rivet, for example and forms a loop portion 65b by fastening a set button 65a.

Figure 20:
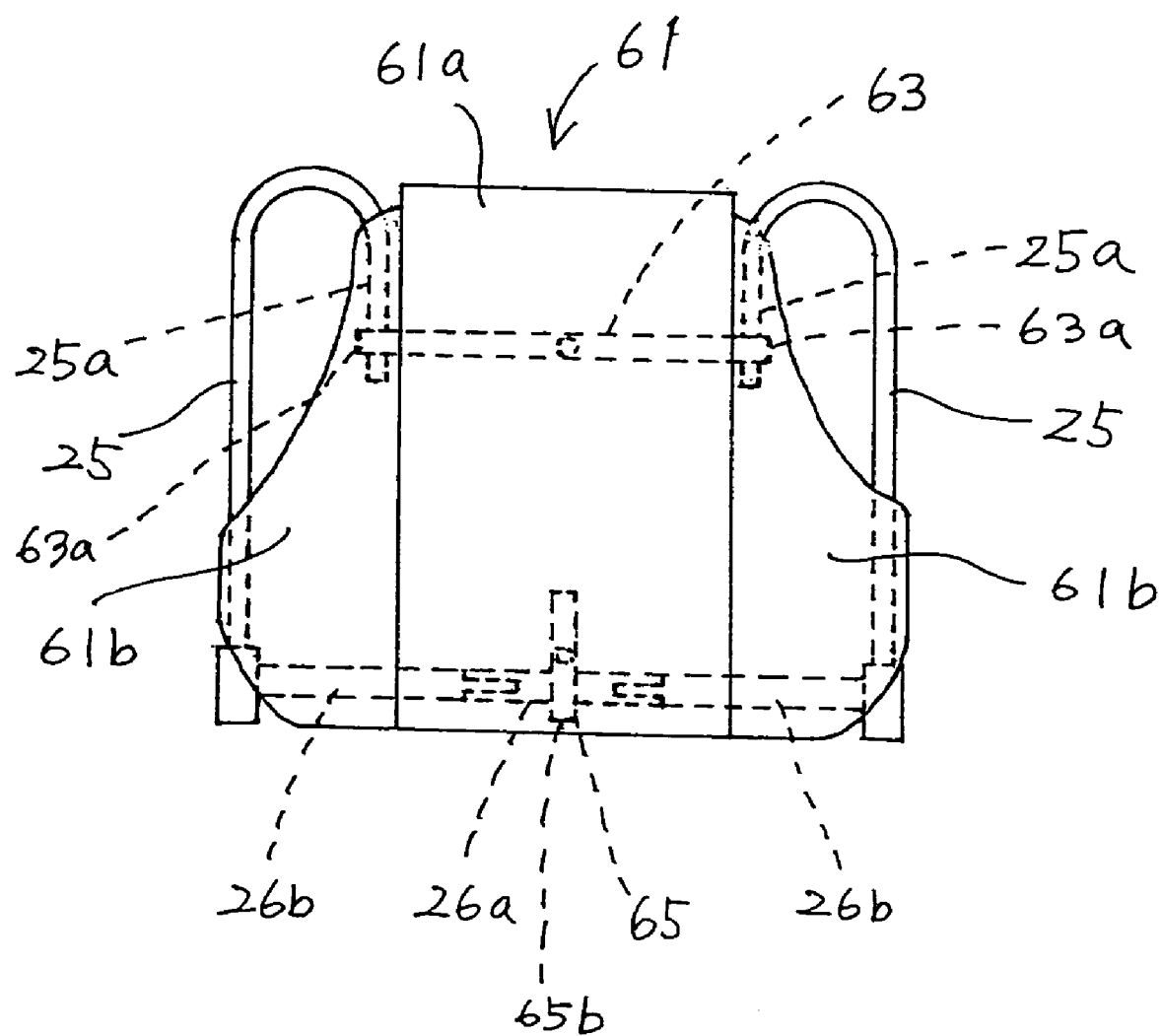
FIG. 20 is a plan view showing a mounted state of the seating surface core and a pair of seating surface supporting side bars.

FIG. 20 is a plan view showing a mounted state of the seating surface core 61 and the pair of seating surface supporting side bars 25. As shown in FIG. 20, the inward extending portions 25a of the pair of seating surface supporting side bars 25 are inserted into the loop portions 63a positioned at both side ends of the rear belt 63, and the center link bar 26a of the bending link member 26 is inserted into the loop portion 65a of the front belt 65.

As described above, the seating surface core 61 is connected to the pair of seating surface supporting side bars 25 through the belt, for example and the seating surface core 61 is stably supported by the pair of inward extending portions 25a from beneath, whereby the position of the seating surface formed by the seating surface core 61 can be surely stabilized.

Although one embodiment of the present invention was described with reference to the drawings, the above described and illustrated embodiment only shows the present invention illustratively. Therefore, various kinds of modifications and variations can be added within the same scope or an equivalent scope as in the present invention. Some of them are illustratively listed and described hereinafter.

(1) According to the illustrated embodiment, the push bar 40 comprises the pair of side vertical bars 41 and the middle bar 43 and the side vertical bar 41 and the middle bar 43 are connected in the state a three-dimensional movement is restricted. As its variation, the push bar is constituted by two members and the two members may be connected in the state the three-dimensional movement is restricted.

(2) The inverted U-shaped push bar may be constituted by a single bar-shaped member. In this case also, the inverted U-shaped push bar comprises a part of a pair of side vertical bars and a part of an upper end lateral bar which connects upper ends of the part of the side vertical bars. The part of the upper end lateral bar keeps the linear configuration in both opened and folded states. The part of the pair of side vertical bars includes upper ends whose distance is not changed in both opened and folded states and lower ends whose distance is reduced as the baby carriage transits from the opened state to the folded state.

(3) According to the illustrated embodiment, the push bar is employed as an example of the inverted U-shaped member extending to rise upward from both sides of the seating surface portion. However, the inverted U-shaped member is not limited to the push bar. The inverted U-shaped member may be formed of another member instead of the push bar. For example, the above-described inverted U-shaped member may be formed of a member supporting the backrest portion of the seat hammock. In such structure also, the rigidity of the baby carriage in the opened state can be increased.

(4) In a case of a baby carriage which can be changed in position so as to be pushed from behind and pushed face-to-face, the push bar is constituted by the inverted U-shaped member having the above-described structure and in addition to that, the further provided inverted U-shaped member having the above structure in which it rises upward from both sides of the seating surface portion. In this structure, since the inverted U-shaped members having high rigidity are provided double, the rigidity of the baby carriage is further increased.

(5) From a viewpoint of enhancing the rigidity of the baby carriage in the opened state, the present invention can be applied to a baby carriage which is folded without being reduced in dimension in the width direction. As one example of such folding baby carriage, it is folded so that four wheels approach each other back and forth only. In a widely spread folding baby carriage, a lower frame structure positioned over four wheels to form a seating surface portion of a seat is folded. This folding baby carriage comprises a push bar for moving the baby carriage and an inverted U-shaped member extending to rise upward from both sides of the seating surface portion and keeping substantially the same configuration in both opened and folded states without actually being bent out of a plane thereof, separately from the push bar. Since such inverted U-shaped member is provided, the rigidity of the baby carriage in the opened state is enhanced.

(6) In the case where the above widely spread folding baby carriage comprises a push bar which can be changed between a state pushed from behind and a state pushed face-to-face, when the above inverted U-shaped member is provided, the rigidity of a seat structure of the baby carriage in the state pushed face-to-face can be preferably maintained, especially. The lower frame structure includes a pair of handrail members positioned above both sides of the seating surface and the inverted U-shaped member extends to rise upward from a rear end of the pair of handrail members, for example. The inverted U-shaped member is used as a frame for supporting a backrest portion of the seat, for example. Alternatively, the inverted U-shaped member is used as a part of a roof for shade.

What is claimed is:

1. A folding baby carriage that comprises four wheels and that is foldable from an unfolded opened state to a folded state whereby the four wheels thereof approach each other back and forth and from side to side, further comprising:
   a lower frame structure that is positioned over the four wheels to form a seating surface portion of a seat, and that is foldable from said opened state to said folded state so as to approach back and forth and from side to side with said four wheels; and
   an inverted U-shaped member that comprises two upwardly extending bars which extend upward from two sides of said seating surface portion;
   wherein said inverted U-shaped member remains on a single plane both in said opened state and in said folded state without being bent out of said plane, said two upwardly extending bars respectively have two upper ends that remain a same distance apart from one another in both said opened state and said folded state, and said two upwardly extending bars respectively have two lower ends that are arranged and adapted to be closer together to one another in said folded state and farther apart from one another in said opened state.

2. The folding baby carriage according to claim 1, wherein said inverted U-shaped member further comprises a middle bar member to which said upper ends of said upwardly extending bars are connected in a state in which a three-dimensional relative movement thereof is restricted.

3. The folding baby carriage according to claim 2, wherein said middle bar member has a respective peripheral wall receiving an edge of a respective one of said upper ends and restricting back-and-forth and up-and-down movements thereof.

4. The folding baby carriage according to claim 3, further comprising a pin extending in a back-and-forth direction and connecting said middle bar member and a respective one of said upper ends.

5. The folding baby carriage according to claim 2, wherein in said opened state,
   said two upwardly extending bars include lower regions extending parallel to each other from said lower ends to a predetermined height, upper regions extending upwardly from said predetermined height and slanting closer together toward said upper ends, and horizontal regions extending inward from upper portions of said upper regions in a width direction and terminating at said upper ends, and
   said middle bar member connects said inner ends of said horizontal regions.

6. The folding baby carriage according to claim 5, wherein said inverted U-shaped member is a push bar for moving the baby carriage,
   said inverted U-shaped member further includes cover members covering respective bar portions extending from said horizontal regions to said upper regions, and
   said cover members respectively have projections protruding outward.

7. The folding baby carriage according to claim 6, wherein a distance between said projections positioned at right and left sides is almost the same as a length between outer sides of right and left wheels of said four wheels in the folded state.

8. The folding baby carriage according to claim 1, wherein said inverted U-shaped member further comprises an upper end lateral bar connecting together said upper ends of said upwardly extending bars, and wherein said upper end lateral bar allows a slight deflection of said upwardly extending bars so that said two lower ends come closer together in said folded state than in said opened state while always remaining in said plane.

9. The folding baby carriage according to claim 8, wherein in said opened state, said two upwardly extending bars include lower regions extending parallel to each other from said lower ends to a predetermined height and upper regions extending upwardly from said predetermined height and slanting closer together toward said upper ends.

10. The folding baby carriage according to claim 9, wherein a length of a part of said upper end lateral bar connecting said upper ends of said upwardly extending bars is almost the same as a length between outer sides of right and left wheels of said four wheels in said folded state.

11. The folding baby carriage according to claim 8, wherein said lower frame structure has a connection structure that is connected to said lower ends and that allows inclination of said upwardly extending bars in accordance with a transition from said opened state to said folded state.

12. The folding baby carriage according to claim 8, wherein said lower frame structure comprises:
a pair of handrail members positioned above two sides of the seating surface portion, and
a connection axis turnably connecting a rear end of a respective one of said handrail members and a respective one of said upwardly extending bars, and
wherein said handrail member includes an abutting wall surface opposed to said respective upwardly extending bar through said connection axis, said abutting wall surface passing said connection axis and abutting on said respective upwardly extending bar, and separated wall surfaces positioned above and below said abutting wall surface and forming a clearance with said respective upwardly extending bar.

13. The folding baby carriage according to claim 8, wherein said lower frame structure comprises:
a rear leg having a rear wheel of said four wheels;
an inverting member turnably connected to said rear leg through a connection pin, provided along said rear leg above said connection pin in said opened state, and provided along said rear leg below said connection pin in said folded state; and
a connection axis turnably connecting an edge of said inverting member and a respective one of said upwardly extending bars, and
wherein said inverting member includes an abutting wall surface opposed to said respective upwardly extending bar through said connection axis, said abutting wall surface passing said connection axis and abutting on said respective upwardly extending bar, and separated wall surfaces positioned above and below said abutting wall surface and forming a clearance with said respective upwardly extending bar.

14. The folding baby carriage according to claim 1, wherein said lower frame structure comprises a pair of seating surface supporting side bars extending in a back-and-forth direction along two sides of said seating surface portion in order to support a seating surface member from beneath,
wherein each one of said seating surface supporting side bars integrally has an inward extending portion extending toward an inside so as to support said seating surface member from beneath.

15. The folding baby carriage according to claim 14, wherein said inward extending portion extends from a rear part of said seating surface supporting side bar to the inside.

16. The folding baby carriage according to claim 14, wherein said inward extending portion is formed by bending a rear end portion of said seating surface supporting side bar to the inside in a shape of a horseshoe.

17. The folding baby carriage according to claim 14,
wherein said seating surface member comprises a plate-shaped seating surface core, and
wherein said seating surface core is connected to said pair of seating surface supporting side bars.

18. The folding baby carriage according to claim 17, wherein said seating surface core is connected to said inward extending portions of said pair of seating surface supporting side bars.

19. The folding baby carriage according to claim 17, further comprising a bending link member connecting front portions of said pair of seating surface supporting side bars,
wherein said bending link member has a center link bar and a pair of side link bars provided so as to be allowed to be bent, and
said seating surface core is connected to said center link bar.

20. A folding baby carriage comprising a lower frame structure positioned over four wheels to form a seating surface portion of a seat, in which said lower frame structure is foldable from an unfolded opened state to a folded state, and further comprising:
a push bar for moving said baby carriage; and
an inverted U-shaped member that is separate from said pushbar, and that comprises two upwardly extending bars which extend upward from two sides of said seating surface portion;
wherein said inverted U-shaped member remains on a single plane both in said opened state and in said folded state without being bent out of said plane, said two upwardly extending bars respectively have two upper ends that remain a same distance apart from one another in both said opened state and said folded state, and said two upwardly extending bars respectively have two lower ends that are arranged and adapted to be closer together to one another in said folded state and farther apart from one another in said opened state.

21. The folding baby carriage according to claim 20, wherein said push bar is provided so as to be changeable between a state pushed from behind and a state pushed face-to-face.

22. The folding baby carriage according to claim 20, wherein said lower frame structure includes a pair of handrail members positioned above two sides of said seating surface portion, and
said inverted U-shaped member extends to rise upward from a rear end of said pair of handrail members.

23. The folding baby carriage according to claim 20, wherein said inverted U-shaped member is a frame for supporting a backrest portion of said seat.

24. The folding baby carriage according to claim 20, wherein said inverted U-shaped member is a part of a roof for shade.

* * * * *

UNITED STATES PATENT AND TRADEMARK OFFICE
CERTIFICATE OF CORRECTION

| | | |
|---|---|---|
| PATENT NO. | : 7,114,743 B2 | Page 1 of 1 |
| APPLICATION NO. | : 10/762199 | |
| DATED | : October 3, 2006 | |
| INVENTOR(S) | : Kassai et al. | |

It is certified that error appears in the above-identified patent and that said Letters Patent is hereby corrected as shown below:

Column 13,
Line 50, replace "surf ace" by --surface--;
Line 54, replace "wail" by --wall--.

Signed and Sealed this

Tenth Day of April, 2007

JON W. DUDAS
*Director of the United States Patent and Trademark Office*